(12) United States Patent
Nikolov

(10) Patent No.: US 10,949,401 B2
(45) Date of Patent: Mar. 16, 2021

(54) DATA REPLICATION IN SITE RECOVERY ENVIRONMENT

(71) Applicant: VMware, Inc., Palo Alto, CA (US)

(72) Inventor: Dian Nikolov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 561 days.

(21) Appl. No.: 14/315,091

(22) Filed: Jun. 25, 2014

(65) Prior Publication Data
US 2015/0379038 A1 Dec. 31, 2015

(51) Int. Cl.
| | |
|---|---|
| G06F 16/18 | (2019.01) |
| G06F 11/14 | (2006.01) |
| G06F 16/27 | (2019.01) |
| G06F 16/951 | (2019.01) |
| G06F 11/20 | (2006.01) |
| G06F 16/23 | (2019.01) |

(52) U.S. Cl.
CPC ...... *G06F 16/1815* (2019.01); *G06F 11/1448* (2013.01); *G06F 11/203* (2013.01); *G06F 11/2097* (2013.01); *G06F 16/2358* (2019.01); *G06F 16/275* (2019.01); *G06F 16/951* (2019.01); *G06F 11/1484* (2013.01); *G06F 11/2071* (2013.01); *G06F 2201/80* (2013.01); *G06F 2201/825* (2013.01)

(58) Field of Classification Search
CPC ........... G06F 17/30191; G06F 11/1448; G06F 11/203; G06F 11/2097; G06F 17/30581; G06F 17/30864; G06F 11/1484; G06F 11/2071; G06F 2201/80; G06F 2201/825

USPC ......................................................... 707/622
See application file for complete search history.

(56) References Cited

U.S. PATENT DOCUMENTS

| | | | | |
|---|---|---|---|---|
| 8,712,970 | B1* | 4/2014 | Sim-Tang | G06F 17/30286 707/672 |
| 8,818,943 | B1* | 8/2014 | McCline | G06F 17/30575 707/624 |
| 8,938,429 | B1* | 1/2015 | Bergant | G06F 11/1662 707/645 |
| 9,213,717 | B1* | 12/2015 | Pawar | G06F 17/30171 |
| 9,424,265 | B1* | 8/2016 | Sui | G06F 11/1446 |
| 9,785,510 | B1* | 10/2017 | Madhavarapu | G06F 3/065 |
| 2005/0076264 | A1* | 4/2005 | Rowan | G06F 11/1469 711/162 |

(Continued)

*Primary Examiner* — Hares Jami
*Assistant Examiner* — Alicia M Antoine
(74) *Attorney, Agent, or Firm* — Patterson + Sheridan, LLP

(57) ABSTRACT

Techniques disclosed herein relate to synchronizing a first database with a second database. Embodiments include detecting a write operation modifying properties of a data object in the first database. While the data object is locked, embodiments write object change data to a journal table. Embodiments query the journal table of the recovery database to retrieve a portion of the object change data corresponding to a first window of time and comprising a plurality of entries. The retrieved portion of object change data is processed to create processed object data by collapsing duplicate entries within the plurality of entries. Embodiments retrieve object data from the first database, corresponding to properties of data objects specified in the processed object change data. The retrieved object data is pushed to the second database, whereby the second database is synchronized with the first database.

19 Claims, 4 Drawing Sheets

(56) References Cited

U.S. PATENT DOCUMENTS

| | | | | |
|---|---|---|---|---|
| 2006/0190504 A1* | 8/2006 | Pruet, III | G06F 17/30362 | 707/999.204 |
| 2006/0200829 A1* | 9/2006 | Astl | G06F 11/0715 | 719/314 |
| 2007/0226438 A1* | 9/2007 | Erofeev | G06F 17/30575 | 711/162 |
| 2008/0059469 A1* | 3/2008 | Pruet | G06F 17/30581 | 707/999.008 |
| 2008/0215586 A1* | 9/2008 | Pruet | G06F 17/30362 | 707/999.008 |
| 2011/0307736 A1* | 12/2011 | George | G06F 17/30519 | 714/6.2 |
| 2012/0005154 A1* | 1/2012 | George | G06F 17/30578 | 707/607 |
| 2013/0159247 A1* | 6/2013 | Engelko | G06F 17/30309 | 707/609 |
| 2014/0047202 A1* | 2/2014 | Vellore | G06F 11/1453 | 711/162 |
| 2014/0067763 A1* | 3/2014 | Jorapurkar | G06F 11/1469 | 707/639 |
| 2014/0172803 A1* | 6/2014 | Diaconu | G06F 16/128 | 707/649 |
| 2014/0279929 A1* | 9/2014 | Gupta | G06F 17/30345 | 707/683 |
| 2015/0046401 A1* | 2/2015 | Xing | G06F 11/1453 | 707/638 |
| 2015/0095289 A1* | 4/2015 | Prabhu | G06F 17/30073 | 707/672 |
| 2015/0127619 A1* | 5/2015 | Jarvis | G06F 17/30327 | 707/685 |
| 2015/0199415 A1* | 7/2015 | Bourbonnais | G06F 16/273 | 707/615 |
| 2015/0227439 A1* | 8/2015 | Xing | G06F 3/0664 | 714/15 |
| 2015/0242400 A1* | 8/2015 | Bensberg | G06F 17/30339 | 707/615 |
| 2015/0261808 A1* | 9/2015 | Zhou | G06F 17/30368 | 707/703 |
| 2015/0278329 A1* | 10/2015 | Hrle | G06F 16/27 | 707/615 |
| 2015/0370644 A1* | 12/2015 | Graefe | G06F 11/1466 | 707/624 |
| 2016/0259837 A1* | 9/2016 | Itoh | G06F 16/275 | |

* cited by examiner

DATA REPLICATION IN SITE RECOVERY ENVIRONMENT

BACKGROUND

Virtualization management software allows multiple virtual machines (VMs) to execute on a single hardware computing platform. Each VM is an abstraction of a physical computing system and executes a "guest" operating system. Virtualization management software also manages how hardware computing resources are allocated to each VM. A group of hardware computing platforms may be organized as a cluster to provide the hardware computing resources for the VMs. In a data center, it is common to see hundreds, even thousands, of VMs running on multiple clusters of host servers.

When a server cluster at one location fails, the virtual infrastructure at that location may be recovered at a remote location through a disaster recovery process. Such disaster recovery restarts the entire data center (or a portion thereof) at the remote location by replicating the virtual infrastructure at the remote location. Commercially available disaster recover products include VMware® vCenter™ Site Recovery Manager™.

As part of such disaster recovery, a client application may provide an interface through which administrators can visualize the status of various VMs at one or more locations. For example, such an interface may convey information such as a unique identifier for a VM, a current status of the VM, a network address associated with the VM, and so on. An administrator can use such an interface to monitor the VMs as well as initiating operations for the VMs. For example, one such operation could include a test designed to simulate a disaster recovery operation for the VMs within a particular protected site.

DETAILED DESCRIPTION

Figure 1:
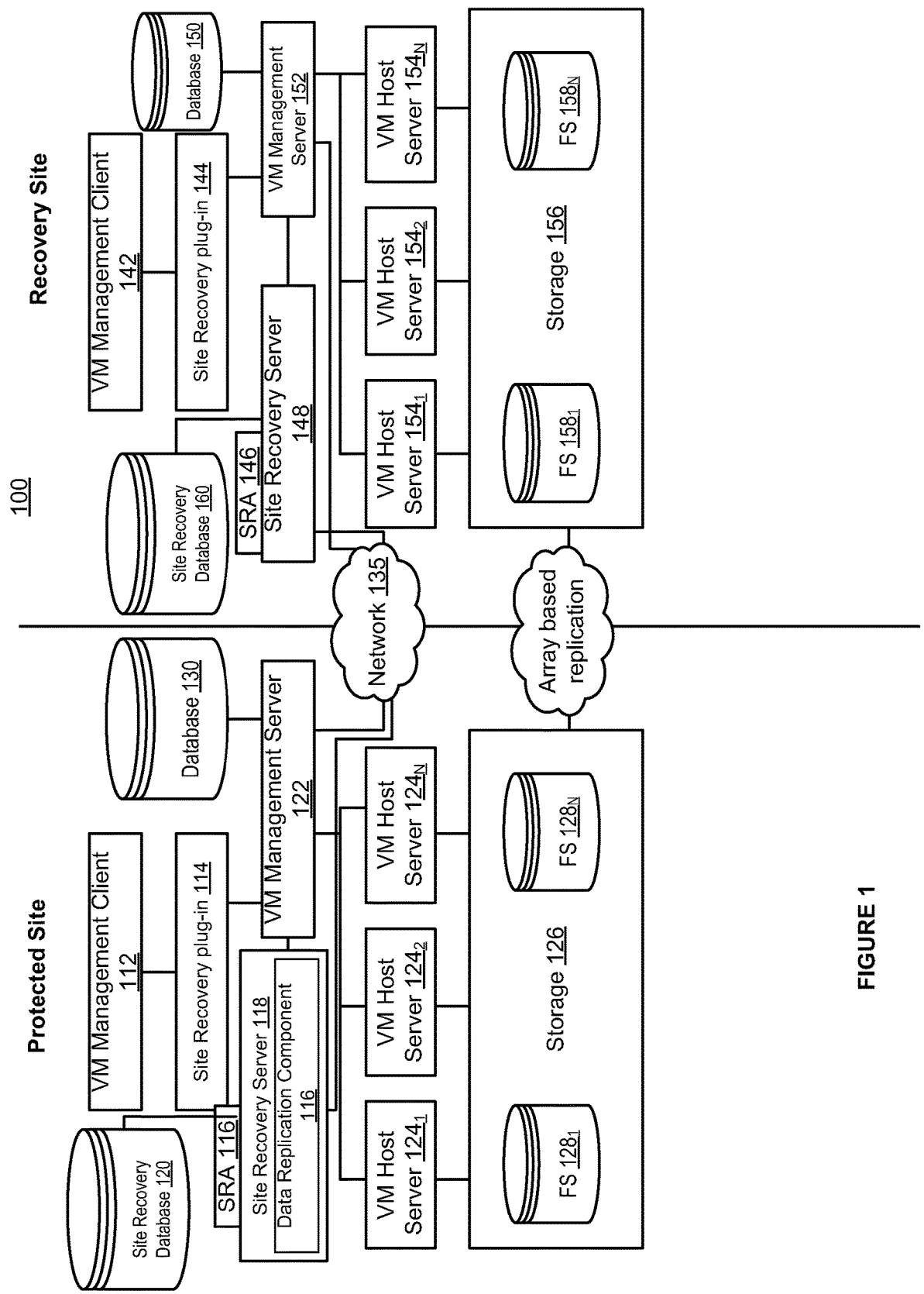
FIG. 1 illustrates a site recovery system configured with a data replication component, according to an embodiment described herein.

Many disaster recovery environments include some form of client application through which a user can view metadata describing various objects (e.g., VMs) within the environment. For example, such a client application can provide an interface that includes visualizations of each of the various objects within the environment and information describing these objects. Such an interface can allow the user (e.g., an administrator) to quickly ascertain the status of the disaster recovery environment and the various objects within the environment.

For instance, a site recovery platform may maintain managed objects that are used to provide disaster recovery services, status information for resources and systems within the environment, test information pertaining to site recovery operations and so on. In addition, a site recovery platform may provide site recovery services at each of two or more sites (e.g., a primary site and a secondary site). Generally, it is preferable for these sites to reside in different geographical locations to help ensure that all of the sites do not become unavailable at the same time. Additionally, the site recovery platform may maintain information regarding pairs of replicated storage array between the various sites, and the data describing protection groups within the environment. Generally, a protection group refers to a set of replicated virtual machines. As part of providing such services, the site recovery platform may maintain configuration data for the recovery operations and the various resources within each of the sites (e.g., in a site recovery database).

As yet another example, the site recovery platform may maintain recovery plan information within the site recovery database. Such recovery plan information can provide a sequence of operations to recover (e.g., power on and potentially reconfigure) protected VMs (e.g., the protected VMs within one or more protection groups) and resources (e.g., storage) used by the VMs, and can further specify custom scripts that should be executed as part of a recovery operation. Generally, the recovery plans can be used to recover VMs and other resources (e.g., from a primary site to a second site), in the event of a failure or other event that causes the VMs and other resources to become unavailable. Additionally, the site recovery platform could be operable in an evaluation mode for the recovery plans, in which the recovery plans are executed in a simulation of a disaster recovery scenario. As part of such a simulation, the site recovery platform may maintain data (e.g., in the site recovery database) describing attributes of objects (e.g., VMs, storage resources, etc.) during the simulation. Doing so allows users to monitor the status and ultimate outcome of the test (e.g., by viewing a visualization of the test data in a user interface).

In some situations, the site recovery data and metadata needed to render such an interface is stored within the site recovery database in a format that is inconvenient or inefficient for use in rendering the interface. As such, embodiments presented herein provide techniques to synchronize data across databases in a disaster recovery environment. One embodiment provides techniques to selectively push data from a site recovery database to an inventory service database, where the data is then stored in a format adapted to facilitate efficient queries from a user interface component. For instance, embodiments can create a journal of changes to data objects within the site recovery database. A data replication component for the site recovery platform can then select a portion of the journal to push to the inventory service database (e.g., a portion corresponding to a particular time range). Prior to pushing the data to the inventory service database, the data replication component can process the selected portion of the journal to eliminate any duplicate and/or outdated changes, in order to avoid pushing unnecessary information to the inventory service database. Once the portion of data is processed to remove any unneeded entries, the data replication component can retrieve the data values corresponding to the changes in the selected portion of the journal from the site recovery database and can push the retrieved data values to the inventory service database. The inventory service database, upon receiving the data, can store the data in a format adapted to facilitate efficient querying of the database (e.g., by a user interface component). For example, the inventory service database may store all of the data values needed to render a particular screen of the user interface within a single table, in order to avoid the need to perform any JOIN operations when the data is queried. Doing so provides an optimized way to make data from the site recovery database available for efficient querying.

FIG. 1 illustrates a site recovery system configured with a data replication component, according to an embodiment described herein. As shown, system 100 includes a protected site 110 and a recovery site 140. Generally, protected site 110 represents a general computing environment (e.g., a production environment for a particular application) and recovery site 140 represents a failover computer environment for use in the event of a problem with protected site 110. For example, data for an application hosted at protected site 110 can be replicated from protected site 110 to recovery site 140 and, upon detecting a problem occurring at protected site 110, VMs can be migrated from protected site 110 to recovery site 140 and the migrated VMs can use the replicated data to continue the execution of the application.

As shown, protected site 110 includes a VM management client 112, a site recovery plug-in 114 for the client, a site recovery server 118 configured with a data replication component 116, a VM management server 122, a site recovery database 120, a second database, which is an inventory service database 130, a plurality of VM host servers $124_{1-N}$, and storage 126. In one embodiment, VM management client 112 represents one or more instances of vSphere® client provided by VMware, Inc. Storage 126 includes a plurality of virtual machine file systems $128_{1-N}$.

Additionally, each of the VM host servers $124_{1-N}$ can host one or more VMs (not shown). In one embodiment, VM host servers $124_{1-N}$ are ESXi® servers provided by VMware, Inc. Generally, virtual machines deployed on VM host servers $124_{1-N}$ can be replicated from protected site 110 to recovery site 140 during disaster recovery. Specifically, portions of storage 126 and contents of file systems $128_{1-N}$, or other forms of persistent mass storage, that store the virtual disks of VMs deployed on VM host servers $124_{1-N}$ may be replicated from protected site 110 to recovery site 140 (e.g., for storage in storage 156 on file systems $158_{1-N}$). When the entire protected site (or a portion thereof) fails as a result of, e.g., power outage, flood, or other disaster scenarios, VMs deployed on VM host servers $124_{1-N}$ may be quickly recovered to VM host servers $154_{1-N}$ at recovery site 140. Commercially available disaster recovery software as represented by site recovery server 118 includes Site Recovery Manager™ provided by VMware, Inc.

Generally, virtualization software on VM host servers $124_{1-N}$ performs system resource management and virtual machine resource emulation. Virtual machine resource emulation may be performed by a virtual machine monitor (VMM) component (not shown). In some implementations, each virtual machine deployed on VM host servers $124_{1-N}$ may have a corresponding VMM instance. Depending on implementation, virtualization software may be unhosted or hosted. Unhosted virtualization software generally relies on a specialized virtualization kernel for managing system resources, whereas hosted virtualization software relies on a commodity operating system—the "hosting operating system"—such as Windows®, Mac OS X®, or Linux® to manage system resources.

Each VM deployed on VM host servers $124_{1-N}$ includes a respective virtual disk which is stored in shared storage 126. For purposes of disaster recovery, shared storage 126, and in particular portions of shared storage 126 storing VM files such as virtual disk and configuration files (e.g., .vmx files), are replicated to a shared storage 156 at recovery site 140. Various techniques are known for storage replication, including array-based replication techniques and vSphere® Replication provided by VMware, Inc. The configuration files that are replicated may include configuration information and hardware settings of the VM. Guest OS configuration, including TCP/IP settings, are thus preserved in the configuration files after a disaster event.

In one embodiment, VM management client 112 represents a web client application capable of generating an interface visually representing a status of VMs executing on VM host servers $124_{1-N}$. Site recovery database 120 represents a data store containing data and metadata describing various attributes of the VMs executing on VM host servers $124_{1-N}$. For example, site recovery database 120 may store this data and metadata as a plurality of key-value pairs. While storing such data as key-value pairs can be well suited for queries from site recovery server 118, it may be inefficient for VM management client 112 to query site recovery database 120 for information relating to various attributes of the VMs executing on VM servers $124_{1-N}$, as such queries may require a reference to the respective key for each data value being retrieved.

As such, data replication component 116 detects when site recovery server 118 is processing a request for a write operation relating to a VM hosted on one of VM host servers $124_{1-N}$. Generally, data replication component 116 is configured to detect any write operation which changes one or more properties of one or more data objects in site recovery database 120. Upon detecting the write operation, and while a data object within site recovery database 120 is locked as a result of the detected write operation, data replication component 116 employs a first thread to write change data for the write operation to a journal table of site recovery database 120. It should be noted that, while a particular thread is used to update the journal table in this example, it is contemplated that data replication component 116 may manage any number of threads for this purpose and any one of these multiple threads can be used to update the journal table. Moreover, data replication component 116 may use the first thread to append data to the journal table, such that the first thread does not require a lock on the journal table in order to record the intercepted data. Doing so allows the data replication component 116 to run multiple threads configured to intercept write operations and append data to the journal table in parallel and without creating lock contention for the journal table.

Additionally, data replication component 116 may use another thread (i.e., a thread separate and distinct from the thread(s) used to update the journal table) to query the journal table of site recovery database 120 to retrieve a portion of the object change data containing a plurality of entries corresponding to a first window of time. The other thread of data replication component 116 may further process the retrieved portion of data to collapse any duplicate entries within the data. For example, if the retrieved data includes three separate entries that indicate the status of a particular VM as "Online", data replication component 116 could collapse these entries into a single entry. By doing so, data replication component 116 avoids replicating redundant information to inventory service database 130, thereby avoiding the waste of bandwidth and processing resources between databases 120 and 130. Moreover, by using a separate thread to query the journal table and process the queried data, data replication component 116 may continue using other threads to record new data to the journal table in parallel.

As another example, data replication component 116 may determine that the retrieved change data contains a number of update operations to a particular data value (e.g., a network address for a particular VM). Moreover, data replication component 116 may further detect that the change data contains a delete operation to the particular data value (e.g., due to the VM being shutdown) subsequent to the update operations to the particular data value. In such a situation, data replication component 116 may determine that the update operations are no longer useful information, as the data value was subsequently deleted. Accordingly, data replication component 116 may remove the update operations from the retrieved change data, to avoid replicating change data that is no longer useful information.

Once data replication component 116 finishes processing the retrieved change data to collapse duplicate entries and remove entries that are no longer deemed useful, data replication component 116 retrieves data values for the changed data objects from site recovery database 120. Data replication component 116 then pushes the retrieved object data to database 130, whereby database 130 is synchronized with site recovery database 120. Additionally, database 130 may store the data in a format that is adapted for the efficient processing of queries from VM management client 112. Advantageously, doing so allows VM management client 112 to retrieve the metadata describing the VMs executing on VM servers $124_{1-N}$ from database 130 in an efficient manner, rather than attempting to query the key-value pairs within site recovery database 120 for the metadata.

Similarly, recovery site 140 contains a VM management client 142, a site recovery plug-in 144 for client 142, a VM management server 152, a site recovery server 148, a database 160, a site recovery database 150, a plurality of VM servers $154_{1-N}$, and storage 156 that contains a plurality of FS $158_{1-N}$. Although not shown, site recovery server 148 within recovery site 140 may further be configured with a data replication component 116. Here, the data replication component for site recovery server 148 is configured to push data from site recovery database 150 to inventory service database 160, whereby the data is made available to queries from VM management client 142. Doing so allows VM management client 142 to efficiently query metadata relating to resources within recovery site 140 by accessing database 160 that is synchronized with site recovery database 150, rather than having to query site recovery database 150 directly (e.g., by composing a query attempting to retrieve metadata stored in a substantial number of key-value pairs). Thus, while examples are described herein with respect to protected site 110, it is broadly contemplated that the described techniques could be practiced in recovery site 140 or any other environments consistent with the functionality described herein.

In one embodiment, data replication component 116 is configured to remove any duplicate or unneeded entries from the retrieved data based on a respective generation identifier for each of entry in the retrieved data. Generally, the generation identifier represents a unique identifier that is assigned to the entry when the entry is created. For example, site recovery server 118 may assign a generation identifier to each change operation for a data value within site recovery database 120, where the assigned generation identifier is calculated by incrementing a most recent generation identifier (e.g., if the most recent generation identifier is "1000", the next operation may be assigned the generation identifier "1001"). Data replication component 116 may then use such generation identifiers to detect and remove any redundant entries within the retrieved data. For example, if the data replication component 116 determines that a particular data value was changed in a first change operation to a value of "Offline" and then subsequently (i.e., in another change operation having a later generation identifier) changed to a value of "Online", data replication component 116 may remove the first change operation since the first change operation is no longer indicative of the current state of the data value. Doing so enables data replication component 116 to avoid pushing unnecessary data to inventory service database 130, thereby avoiding wasteful data traffic between and wasteful processing by site recovery database 120 and inventory service database 130.

In one embodiment, data replication component 116 is configured to determine the portion of data to retrieve from the journal table of site recovery database 120 based on a latest generation identifier for data pushed to database 130. For example, inventory service database 130 may store the latest generation identifier for data received from the site recovery database 120, and data replication component 116 may query the inventory service database 130 to retrieve the stored latest generation identifier. Data replication component 116 may then query the journal table within site recovery database 120 to retrieve all entries having a generation identifier more recent than the latest generation identifier retrieved from inventory service database 130. As another example, data replication component 116 may internally maintain the latest generation identifier. Doing so allows data replication component 116 to retrieve all entries written to the journal table since the latest push operation to inventory service database 130.

In another embodiment, database 130 (or an application managing inventory service database 130) transmits a full sync request to data replication component 116, indicating to perform a synchronization operation for the entirety of site recovery database 120 to database 130. In response to such a request, data replication component 116 queries the journal table of the recovery database to all change information within the journal table. Data replication component 116 then processes the retrieved change information to collapse any duplicate entries and to remove any unneeded entries (e.g., update operations relating a data object that was subsequently deleted). In retrieving and processing the change information, data replication component 116 employs a thread that is separate from the thread(s) data replication component 116 uses to record intercepted write operations by site recovery server 118 in the journal table of site recovery database 120, so that the recording thread(s) can continue to append new changes for data values to the journal table as they are intercepted. Data replication component 116 then retrieves data values for the changed data objects (i.e., based on the changes retrieved from the journal table) and may push the data values to database 130, whereby database 130 is synchronized with site recovery database 120 without requiring a restart of database 130.

Figure 2:
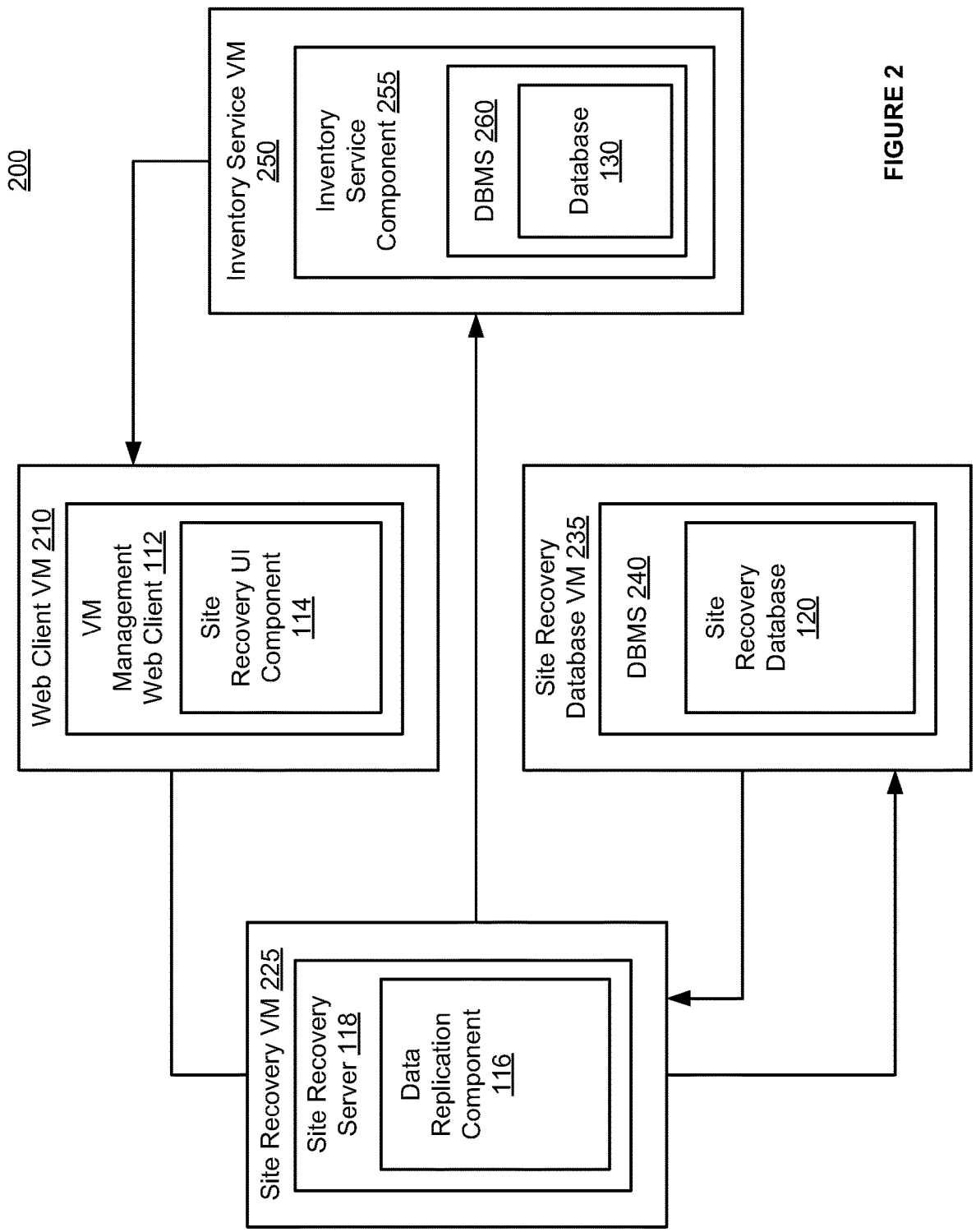
FIG. 2 illustrates a system configured with a data replication component, according to an embodiment described herein.

FIG. 2 illustrates a system configured with a data replication component, according to an embodiment described herein. As shown, system 200 includes a web client VM 210, a site recovery VM 225, a site recovery database (DB) VM 235 and an inventory service VM 250. Web client VM 210 includes a VM management web client 112 that includes a site recovery user interface (UI) component 114. Generally, VM management web client 112 represents a web application that is configured to retrieve metadata describing resources within a computing environment, and site recovery UI component 114 may use such metadata to generate a visualization representing the computing environment and status information for the resources within the site recovery environment.

Site recovery VM 225 includes site recovery server 118, which in turn contains data replication component 116. Additionally, site recovery DB VM 235 contains a database management system (DBMS) 240, which includes site recovery database 120. Moreover, inventory service VM 250 includes an inventory service (IS) component 255 and a DBMS 260, which in turn contains database 130.

Generally, VM management web client 112 provides an interface (e.g., using site recovery UI component 114) with which a user initiates actions (e.g., update operations, deletion operations, creation operations, etc.) for resources within the managed computing environment. For example, a user could use the provided user interface to create a new site recovery test designed to evaluate the failover capabilities of resources within the managed computing environment. In one embodiment, based on the user's interactions with the UI, VM management web client 112 transmits a request to create the test to site recovery server 118. Upon receiving the request, site recovery server 118 processes the request to create the new site recovery test, and as part of such processing, pushes any resulting metadata changes to DBMS 240 for inclusion in site recovery DB 120. Such metadata may include, for instance, an identifier for the new site recovery test, parameters of the site recovery test, a timestamp for the site recovery test, and so on. Moreover, such metadata may be stored in site recovery DB 120 as a plurality of key-value pairs.

As discussed above, data replication component 116 is configured to intercept the write operation to the site recovery DB 120 and, while the corresponding data objects within the site recovery DB 120 are still locked, data replication component 116 uses one of a first set of threads to append data describing the change operation to the data object to a journal table within site recovery DB 120. By using an append operation to the journal table, data replication component 116 avoids lock contention for the journal table amongst the threads of data replication component 116.

Additionally, another thread (i.e., separate from the first set of threads used to append data values to the journal table) of data replication component 116 may be provided to periodically retrieve metadata from the journal table of site recovery database 120 and process the retrieved information to remove any duplicate or unneeded entries. Once any duplicate or otherwise unneeded entries are removed, this thread may then retrieve the property values for the changed data objects specified in the entries of the journal table from site recovery database 120. That is, data replication component 116 may access the journal table to retrieve a log of changes and changed data objects, and use this information to access the updated property values for the changed data objects from site recovery database 120.

Data replication component 116 may then push the retrieved property values for the changed data objects across a socket to inventory service component 255 on inventory service VM 250, which is configured to write the property values to DB 130. For instance, inventory service component 255 may write the data to DB 130 in a format that is adapted for efficient querying of the data by VM management web client 112. Advantageously, doing so allows VM management web client 112 to efficiently retrieve the data from DB 130 by submitting a query to DBMS 260.

Figure 3:
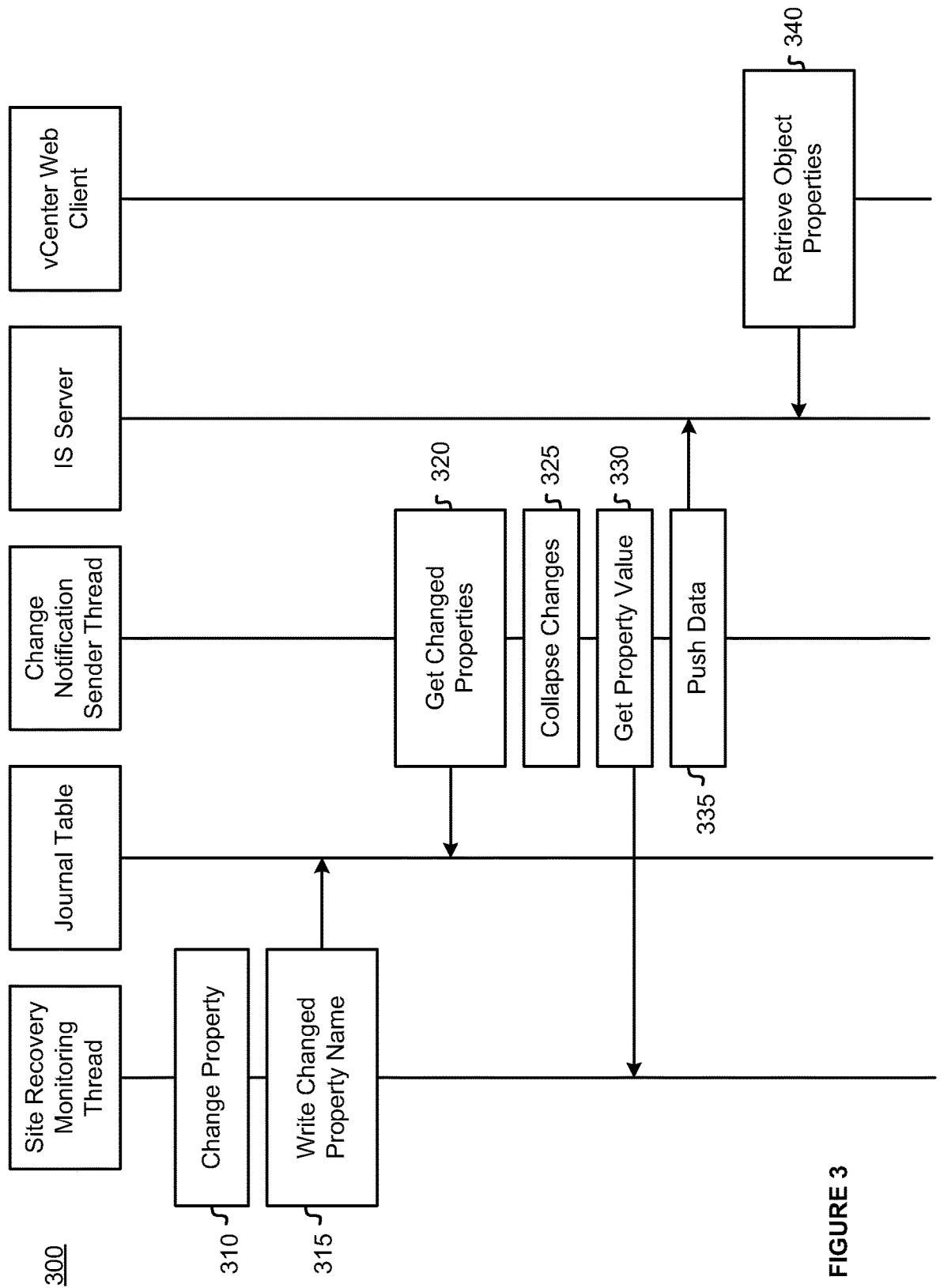
FIG. 3 illustrates a method for synchronizing an inventory service database with a site recovery database, according to an embodiment described herein.

FIG. 3 illustrates a method for synchronizing an inventory service database with a site recovery database, according to an embodiment described herein. As shown, method 300 begins at block 310 where a site recovery monitoring thread of data replication component 116 detects a property change operation to a particular data operation within a site recovery management database. Upon detecting the property change operation, and while a corresponding data object within the site recover management database is still locked, the site recovery monitoring thread of data replication component 116 appends the changed property information to a journal table of the site recovery database (block 315).

At some subsequent point in time, a ChangeNotificationSender thread of data replication component 116 retrieves all changed property data within a determined window of time from the journal table (block 320). For example, the ChangeNotificationSender thread may access a latest generation identifier specifying the most recent generation identifier pushed to an IS database and the ChangeNotificationSender thread may retrieve all data within the journal table having a generation identifier more recent than the latest generation identifier. In the depicted embodiment, ChangeNotificationSender thread of data replication component 116 also collapses any duplicate changes within the retrieved data and removes any unneeded changes within the data (block 325). For example, ChangeNotificationSender thread may remove any changes for a particular data object that are not indicative of or relevant to a current state of the data object. For instance, if the particular data object was previous set to a value of "100" and then later deleted, ChangeNotificationSender thread may determine that the data entry setting the value to "100" is an unneeded data entry as it is not relevant to the current state of the particular data object (i.e., the object is currently deleted). As such, ChangeNotificationSender thread may remove the data entry setting the value to "100" from the retrieved data set, in order to avoid pushing any unneeded data values to the inventory service database.

Once the changes have been collapsed, the changeNotificationSender thread requests the property values for the changed data objects from the site recovery monitoring thread (block 330). In other words, in the depicted embodiment, the journal table in site recovery database 120 only stores a record of changed data objects (and not the values of the data objects themselves). Thus, the changeNotificationSender thread retrieves the values for the changed objects from site recovery database 120, so as to push this data to the IS server. Doing so avoids storing a duplicate data value for each changed data value in site recovery database 120, thereby keeping the memory footprint of site recovery database 120 predictable and minimal. Furthermore, doing so reduces lock contention of the when reading property values, as the changeNotificationSender thread only retrieves the actual data values for changed records a single time prior to pushing the values to the IS server.

In the depicted embodiment, the site recovery monitoring thread, upon receiving such a request, queries site recovery database 120 to retrieve the requested property values. For instance, the changeNotificationSender thread may transmit a list of changed properties to the site recovery monitoring thread and the site recovery monitoring thread could query site recovery database 120 using each of the changed properties on the list as a key in order to retrieve the associated value for the property. Although the changeNotificationSender thread is shown as requesting the values from the site recovery monitoring thread, such a depiction is for illustrative purposes only and without limitation. More generally, the changeNotificationSender thread can be configured to retrieve the values using any suitable technique. For instance, in one embodiment, the changeNotificationSender thread is configured to request the values from another thread or process, while in another embodiment the changeNotificationSender thread retrieves the values directly (e.g., from site recovery database 120).

ChangeNotificationSender thread of data replication component 116 then pushes the retrieved data values across a socket to an inventory service (IS) server, where the data set is written to an inventory service database (block 335). Generally, the IS server represents an application(s) configured to manage the inventory service database. At some subsequent moment in time, the VM management web client retrieves properties for a particular object(s) from the inventory service database for use in rendering a user interface for the site recovery environment (block 345). Generally, the IS server is configured to write the data set to the inventory service database in a formal that is adapted to be efficiently queried by the VM management web client. For example, a known query from VM management web client may reference a particular set of data values, and the IS server may be configured to write all of the data values in the particular set of data values to a single table within inventory service database. Doing so allows the particular set of data values to be retrieved from the inventory service without requiring any join operations between multiple tables of the inventory service database to be performed.

Figure 4:
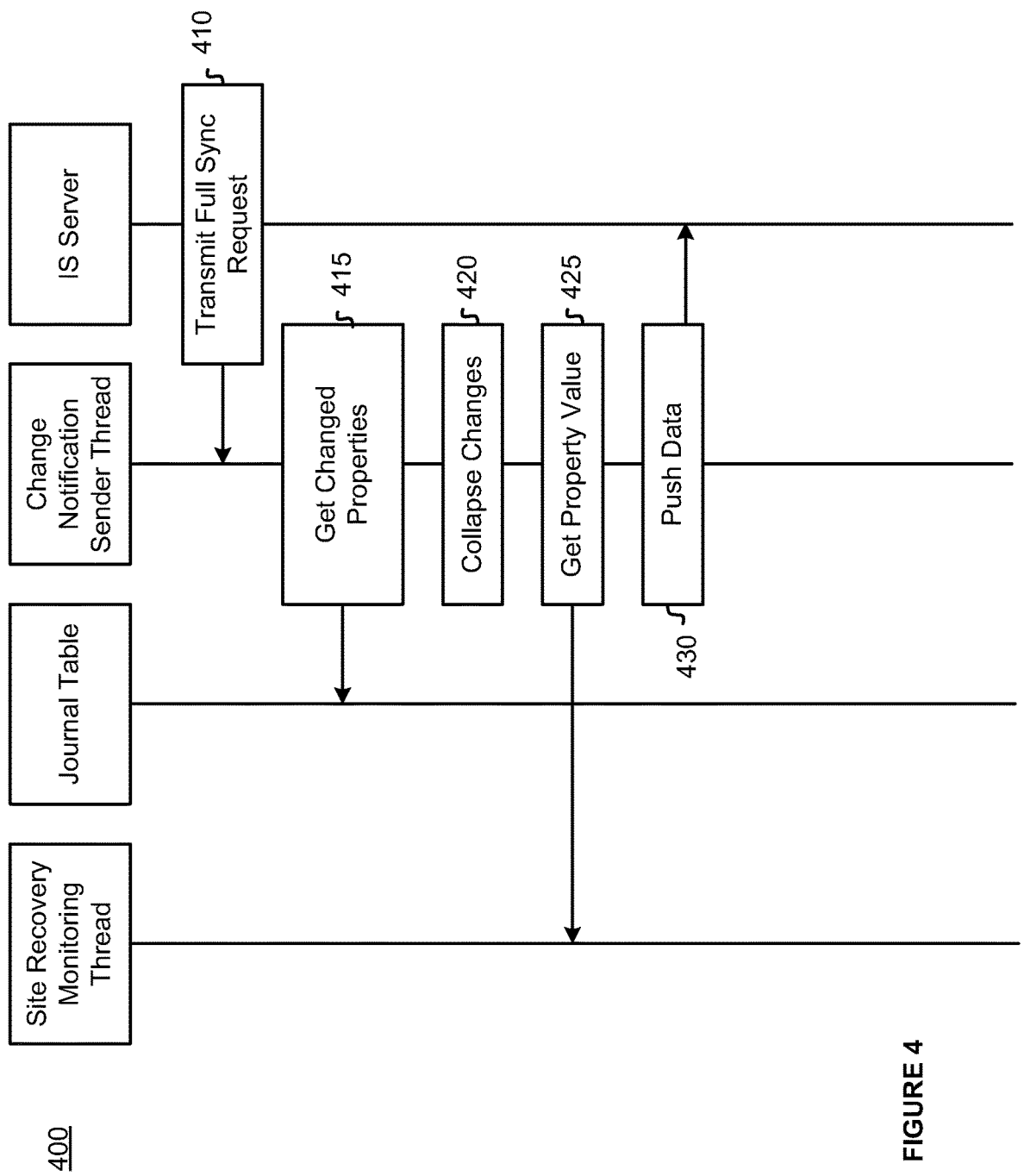
FIG. 4 illustrates a method for pushing data to an inventory service database, according to an embodiment described herein.

FIG. 4 illustrates a method for pushing data to an inventory service database, according to an embodiment described herein. As shown, method 400 begins at block 410, where an inventory service server (e.g., an application configured to manage database 130) transmits a full sync request. Generally, the full sync request is a request to push all changed property values, as indicated by the entirety of the journal table in the site recovery database 120, to the database 130. Such a request may be transmitted, for example, in the event the inventory service database becomes corrupted and needs to be restored or when the inventory service database is first brought online.

Responsive to receiving the request, a ChangeNotificationSender thread of data replication component 116 accesses the journal table within site recovery database 120 (block 415). For example, data replication component 116 may query the journal table to retrieve all change entries having a generation identifier later than an initial generation identifier. ChangeNotificationSender thread of data replication component 116 then collapses duplicate and otherwise unnecessary change entries within the retrieved data set (block 420). Generally, data replication component 116 may remove any entries within the retrieved data set that do not affect the current status of a data object. For example, if a particular value for a data object was changed to a value of "Offline" and then subsequently changed to a value of "Online", the data replication component 116 may remove the entry corresponding to the first change because it is not indicative of the data object's current state (i.e., "Online").

Once data replication component 116 has removed duplicate and otherwise unnecessary data entries from the data set, ChangeNotificationSender thread of data replication component 116 retrieves property values for all of the changed properties of the data object from the site recovery monitoring thread, which could in turn query the site recovery database 120 to access the property values and may return the query results to the ChangeNotificationSender thread (block 425). More generally, it is contemplated that the ChangeNotificationSender thread of data replication component 116 may access the property values using various other techniques, such as requesting the property values from another component or querying the site recovery database 120 directly to access the property values.

Upon receiving the property values, the ChangeNotificationSender thread pushes the property values to the database 130 (block 430) and method 400 ends. Advantageously, doing so allows the database 130 to be efficiently synchronized with site recovery database 120 upon transmission of a full sync request to data replication component 116, and moreover allows database 130 to be synchronized without requiring any restart operations by an inventory service component 255 responsible for managing the database 130.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method of updating a second database included in a second database management system of a site recovery platform to be consistent with a first database included in a first database management system of the site recovery platform by sending changes from the first database to the second database, the method comprising:
    using a first thread of a plurality of threads:
        detecting a write operation modifying one or more property values of one or more properties of one or more data objects in the first database, the first database being a key-value database; and
        while at least one of the one or more data objects within the first database is locked as a result of the detected write operation, writing first object change data, based on the detected write operation, to a journal table of the first database, wherein the writing the first object change data creates a record within the journal table of the first database using an append operation, such that no lock on the journal table of the first database is required to prevent a resource conflict between the first thread and other threads in the plurality of threads, and wherein the record written into the journal table includes an identification of the one or more data objects and not the one or more property values of the properties of the one or more data objects themselves;
    using a second one or more threads distinct from the plurality of threads:
        querying the journal table of the first database to retrieve a portion of all object change data in the journal table, the portion corresponding to a first window of time, the portion comprising a plurality of entries including unneeded entries, the unneeded entries including any duplicate entries and any entries no longer indicative of a current state of any data object in the first database;
        processing the retrieved portion to create processed object change data by removing the unneeded entries from the plurality of entries;
        retrieving object data from the first database, the object data including a particular set of property values in the first database of any changed data objects identified in the processed object change data; and
        sending the retrieved object data to the second database management system, the second database being a database with a single table; and
    receiving the retrieved object data, processing the particular set of property values in the retrieved object data, and writing all of the property values in the particular set of property values to the single table of the second database, whereby the second database is updated to reflect changes in the first database.

2. The method of claim 1,
    wherein processing the retrieved portion to create the processed object change data by removing the unneeded entries is further based on a respective generation identifier for each entry of the plurality of entries, and
    wherein each respective generation identifier is indicative of a respective position of the corresponding entry within a sequence of entries written to the first database.

3. The method of claim 2, wherein the portion is determined based on a last generation identifier for a most recent sending of object data from the first database to the second database.

4. The method of claim 3, further comprising determining the portion by selecting all entries within the journal table having a generation identifier that is more recent than the last generation identifier.

5. The method of claim 1, further comprising:
    receiving a full sync request indicating to perform an update operation to the second database;
    using the second one or more threads:
        querying the journal table of the first database to retrieve second object change data, the second object change data comprising a second plurality of entries identifying all changed data objects in the first database and not any property values of properties of the all the changed data objects themselves;
        processing the retrieved second object change data to create processed second object data by removing any unneeded entries within the second plurality of entries;
        retrieving second object data from the first database, the retrieved second object data including all property values in the first database of any changed data objects identified in the processed second object change data; and
        sending the retrieved second object data to the second database management system; and
    receiving the retrieved second object data, processing all property values in the retrieved second object data, and writing all property values in the retrieved second object data into the single table of the second database, whereby the second database is updated to reflect changes in the first database without requiring a restart of the second database.

6. The method of claim 1,
    wherein a first property of the one or more properties of the one or more data objects is updated two or more times as a result of the write operation; and
    wherein the first object change data represents only a single update to the first property to the journal table of the first database.

7. The method of claim 1, wherein the record further comprises data identifying a type of each of the one or more data objects and data identifying the one or more properties of the one or more data objects changed as a result of the write operation.

8. The method of claim 1, wherein processing the retrieved portion to create the processed object change data by removing the unneeded entries from the plurality of entries further comprises:
identifying a delete operation entry for a first data object within the plurality of entries;
determining a first generation identifier corresponding to the delete operation entry;
identifying any entries for the first data object within the plurality of entries having a respective generation identifier earlier than the first generation identifier; and
removing the identified entries for the first data object from the plurality of entries, prior to sending the object data to the second database.

9. The method of claim 1, wherein processing, using the second one or more threads, the retrieved portion of object change data to remove any unneeded entries within the plurality of entries further comprises:
identifying a create operation entry for a first data object within the plurality of entries for the retrieved portion of object change data;
determining a first generation identifier corresponding to the create operation entry;
identifying any entries for the first data object within the plurality of entries having a respective generation identifier earlier than the first generation identifier; and
removing the identified entries for the first data object from the plurality of entries, prior to sending the object data to the second database.

10. The method of claim 1, further comprising:
transmitting a request to retrieve a generation identifier from the second database, wherein the generation identifier corresponds to a latest sending operation from the first database to the second database that was successfully processed; and
removing all entries from the journal table of the first database having a respective generation identifier that is earlier than the retrieved generation identifier, other than a single create operation entry for each data object having a corresponding entry within the journal table.

11. A non-transitory computer-readable medium containing computer program code that, when executed, performs an operation for updating a second database included in a second database management system of a site recovery platform to be consistent with a first database included in a first database management system of the site recovery platform by sending changes from the first database to the second database, the operation comprising:
using a first thread of a plurality of threads:
detecting a write operation modifying one or more property values of one or more properties of one or more data objects in the first database, the first database being a key-value database; and
while at least one of the one or more data objects within the first database is locked as a result of the detected write operation, writing first object change data, based on the detected write operation, to a journal table of the first database, wherein the writing the first object change data creates a record within the journal table of the first database using an append operation, such that no lock on the journal table of the first database is required to prevent a resource conflict between the first thread and other threads in the plurality of threads, and wherein the record written into the journal table includes an identification of the one or more data objects and not the one or more property values of the properties of the one or more data objects themselves;
using a second one or more threads distinct from the plurality of threads:
querying the journal table of the first database to retrieve a portion of all object change data in the journal table, the portion corresponding to a first window of time, the portion comprising a plurality of entries including unneeded entries, the unneeded entries including any duplicate entries and any entries no longer indicative of a current state of any data object in the first database;
processing the retrieved portion to create processed object change data by removing the unneeded entries from the plurality of entries;
retrieving object data from the first database, the object data including a particular set of property values in the first database of any changed data objects identified in the processed object change data; and
sending the retrieved object data to the second database management system, the second database being a database with a single table; and
receiving the retrieved object data, processing the particular set of property values in the retrieved object data, and writing all of the property values in the particular set of property values to the single table of the second database, whereby the second database is updated to reflect changes in the first database.

12. The non-transitory computer-readable medium of claim 11,
wherein processing the retrieved portion to create the processed object change data by removing the unneeded entries is further based on a respective generation identifier for each entry of the plurality of entries, and
wherein each respective generation identifier is indicative of a respective position of the corresponding entry within a sequence of entries written to the first database.

13. The non-transitory computer-readable medium of claim 12,
wherein the portion is determined based on a last generation identifier for a most recent sending of object data from the first database to the second database;
the operation further comprising determining the portion data by selecting all entries within the journal table having a generation identifier that is more recent than the last generation identifier.

14. The non-transitory computer-readable medium of claim 11, the operation further comprising:
receiving a full sync request indicating to perform an update operation to the second database;
using the second one or more threads:
querying the journal table of the first database to retrieve second object change data, the second object change data comprising a second plurality of entries identifying all changed data objects in the first database and not any property values of properties of the all the changed data objects themselves;
processing the retrieved second object change data to create processed second object data by removing any unneeded entries within the second plurality of entries;

retrieving second object data from the first database, the retrieved second object data including all property values in the first database of any changed data objects identified in the processed second object change data; and sending the retrieved second object data to the second database management system; and receiving the retrieved second object data, processing all property values in the retrieved second object data and writing all property values in the retrieved second object data into the single table of the second database, whereby the second database is updated to reflect changes in the first database without requiring a restart of the second database.

15. The non-transitory computer-readable medium of claim 11,
wherein a first property of the one or more properties of the one or more data objects is updated two or more times as a result of the write operation; and
wherein the first object change data represents only a single update to the first property to the journal table of the first database.

16. The non-transitory computer-readable medium of claim 11, wherein the record further comprises data identifying changed a type of each of the one or more data objects and data identifying the one or more properties of the one or more data objects changed as a result of the write operation.

17. The non-transitory computer-readable medium of claim 11, wherein processing the retrieved portion to create the processed object change data by removing the unneeded entries from the plurality of entries further comprises:
identifying at least one of (i) a delete operation entry or (ii) a create operation entry, for a first data object within the plurality of entries;
determining a first generation identifier corresponding to the at least one of the delete operation entry or the create operation entry;
identifying any entries for the first data object within the plurality of entries having a respective generation identifier earlier than the first generation identifier; and
removing the identified entries for the first data object from the plurality of entries, prior to sending the object data to the second database.

18. The non-transitory computer-readable medium of claim 11, the operation further comprising:
transmitting a request to retrieve a generation identifier from the second database, wherein the generation identifier corresponds to a latest sending operation from the first database to the second database that was successfully processed; and
removing all entries from the journal table of the first database having a respective generation identifier that is earlier than the retrieved generation identifier, other than a single create operation entry for each data object having a corresponding entry within the journal table.

19. A system comprising:
a processor; and
a memory containing a program that, when executed by the processor, performs an operation for updating a second database included in a second database management system of a site recovery platform to be consistent with a first database included in a first database management system of a site recovery platform by sending changes from the first database to the second database, the operation comprising:
using a first thread of a plurality of threads:
detecting a write operation modifying one or more property values of one or more properties of one or more data objects in the first database, the first database being a key-value database; and
while at least one of the one or more data objects within the first database is locked as a result of the detected write operation, writing first object change data, based on the detected write operation, to a journal table of the first database, wherein the writing the first object change data creates a record within the journal table of the first database using an append operation, such that no lock on the journal table of the first database is required to prevent a resource conflict between the first thread and other threads in the plurality of threads, and wherein the record written into the journal table includes an identification of the one or more data objects and not the one or more property values of the properties of the one or more data objects themselves;
using a second one or more threads distinct from the plurality of threads:
querying the journal table of the first database system to retrieve a portion of all object change data in the journal table, the portion corresponding to a first window of time, the portion comprising a plurality of entries including unneeded entries, the unneeded entries including any duplicate entries and any entries no longer indicative of a current state of any data object in the first database;
processing the retrieved portion to create processed object change data by removing the unneeded entries from the plurality of entries;
retrieving object data from the first database, the object data including a particular set of property values in the first database of any changed data objects identified in the processed object change data;
sending the retrieved object data to the second database management system, the second database being a database with a single table; and
receiving the retrieved object data, processing the particular set of property values in the retrieved object data, and writing all of the property values in the particular set of property values to the single table of the second database, whereby the second database is updated to reflect changes in the first database.

* * * * *